United States Patent [19]

Spaggiari

[11] Patent Number: 4,767,386

[45] Date of Patent: Aug. 30, 1988

[54] FLEXIBLE-ELEMENT TRANSMISSION UNIT FOR DRIVING ROTARY MEMBERS IN GENERAL

[75] Inventor: Alessandro Spaggiari, Correggio, Italy

[73] Assignee: SPAL S.r.l., Correggio, Italy

[21] Appl. No.: 854,486

[22] Filed: Apr. 22, 1986

[30] Foreign Application Priority Data

Apr. 23, 1985 [IT] Italy ............................... 34849/85[U]

[51] Int. Cl.⁴ ........................... F16H 7/00; F16H 7/18
[52] U.S. Cl. ..................................... 474/148; 474/144
[58] Field of Search ................................. 474/144–150, 474/140, 154; 180/84; 70/30, 49

[56] References Cited

U.S. PATENT DOCUMENTS

| | | | |
|---|---|---|---|
| 551,811 | 12/1895 | Curtis .............................. | 474/148 X |
| 3,991,594 | 11/1976 | Goenner ............................. | 70/30 |
| 4,158,402 | 6/1979 | Romans ........................... | 474/147 X |
| 4,214,488 | 7/1980 | Conrad ............................. | 474/148 |
| 4,302,954 | 12/1981 | Zisterer .............................. | 70/49 X |
| 4,471,851 | 9/1984 | Kamiya et al. .................. | 474/144 X |
| 4,609,365 | 9/1986 | Eberle ............................. | 474/144 X |

FOREIGN PATENT DOCUMENTS

0007146 of 1894 United Kingdom ................ 474/147

*Primary Examiner*—Stephen J. Novosad
*Assistant Examiner*—Thuy M. Bui
*Attorney, Agent, or Firm*—Bucknam and Archer

[57] ABSTRACT

A transmission unit comprises a flexible element (1) in the form of a flexible metal wire (6) on which a plurality of small equidistant coaxial cylindrical bodies (8) are fixed; the element (1) passes endlessly about two opposing drive and driven sprocket wheels (2), (3) respectively, and the two outward and return portions of said element (1) are slidingly received in two flexible sheaths (10); the two sprocket wheels (2), (3) are rotatably mounted in respective casings (4), (5) in which the opposing ends of said two flexible sheaths (10) are clamped.

6 Claims, 2 Drawing Sheets

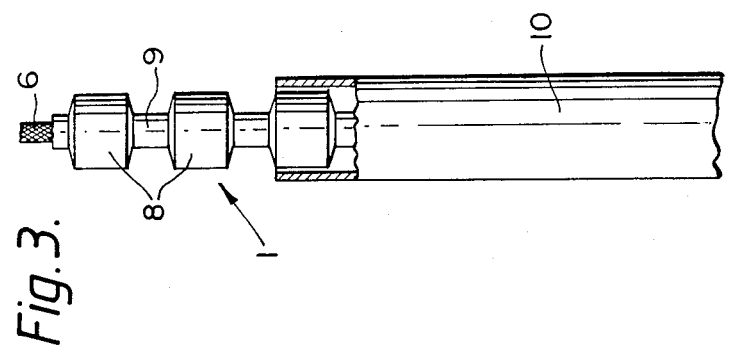
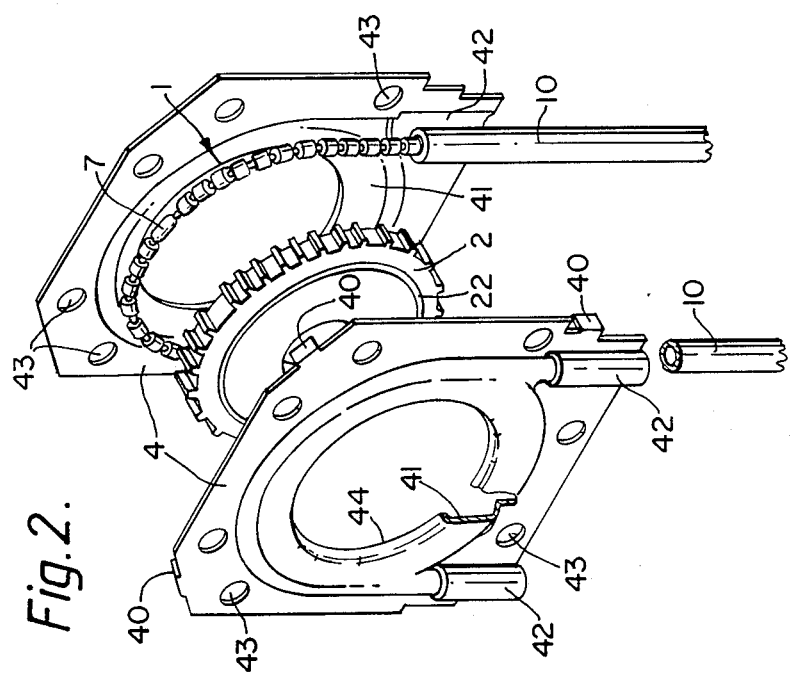

FLEXIBLE-ELEMENT TRANSMISSION UNIT FOR DRIVING ROTARY MEMBERS IN GENERAL

In the most diverse industrial sectors it is often necessary, within very small space or housing constraints, to drive small-dimension rotary members such as gear wheels, shafts and pins, which are required to transmit modest forces in order to drive other rotary or non-rotary elements. For example, these problems arise in the operation of electromechanically-driven side windows of vehicles in general, of sliding curtains and of panels or doors which either slide or rotate under electromechanical control.

In such cases the spaces available for containing the corresponding drive units are notably very small, and very often complicated and costly constructions have to be used in order to adapt to the various cases which arise, this often compromising the proper operation and reliability of the respective drive unit.

The object of the present invention is to provide and protect a transmission unit for said applications, which is of considerable versatility of application, is very robust, is particularly reliable, and is of very small overall size.

Said object is attained according to the invention by a flexible transmission element comprising a metal wire such as a stranded steel cable, on to which a plurality of small equidistant coaxial cylindrical bodies are fixed. These small bodies are constructed of a particularly hard synthetic material, and are directly formed on the cable so as to be strongly bonded thereto.

Said transmission element passes endlessly about two opposing sprocket wheels, namely the drive and driven wheel respectively, which are rotatably mounted in corresponding sectional casings, and the two portions of the flexible element which are external to the casings are tube-encased in two flexible sheaths having their ends clamped in said casings.

In this manner, a transmission unit is obtained which is particularly robust and of small overall size, and is of considerable versatility of application in that the two tube-encased portions of said flexible element can assume any required configuration without compromising the functionality and reliability either of the invention or of the respective drive unit.

The characteristics and constructional merits of the invention will be more apparent from the description given hereinafter with reference to the figures of the accompanyings drawings, which illustrate its application to automobile window regulators for example, and in which:

FIG. 2 is an exploded perspective view of the motion input casing, said casing being shown in an inverted position rotated through 180° with respect to that shown in FIG. 1; and FIG. 3 is an enlarged view of part of one of the tube-encased portions of the flexible element.

Figure 1:
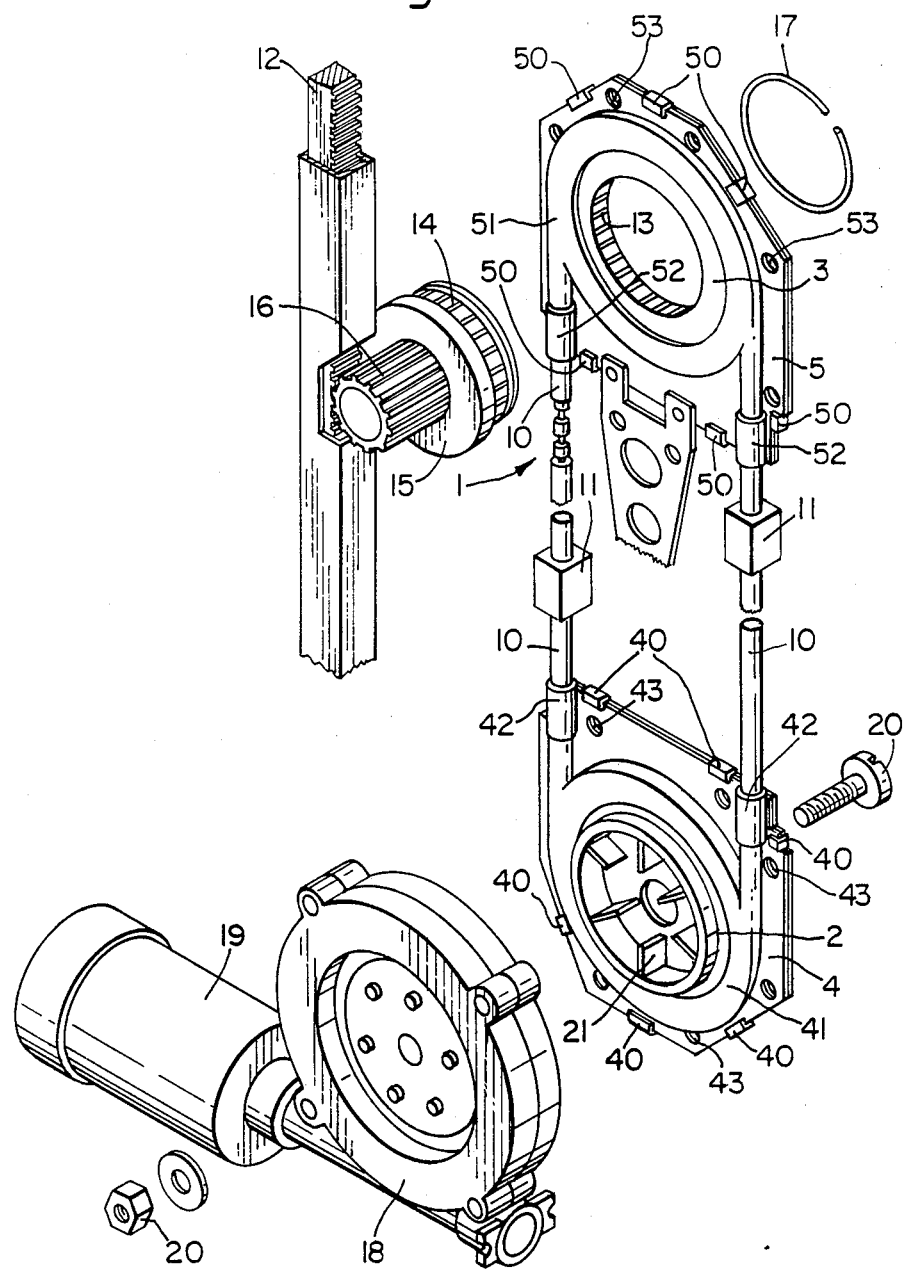
FIG. 1 is a perspective view of the invention, associated with particular motion input and output elements.

From said figures it can be seen that the invention comprises a flexible element 1 passing endlessly about two end sprocket wheels 2, 3, which are constructed of a convenient rigid synthetic material and are used for motion input and output respectively (FIG. 1), said sprocket wheels 2, 3 being rotatably mounted inside respective sectional metal casings 4, 5.

As clearly shown in FIG. 3, said flexible element comprises a stranded metal cable 6, the ends of which are connected together by a metal joint 7.

A plurality of small coaxial cylindrical bodies 8 constructed of a rigid synthetic material are fixed by direct thermoforming on to the cable 6, their opposing ends being in the shape of a spherical cap in order to facilitate their engagement with the toothing of said sprocket wheels 2, 3.

Furthermore, in the case illustrated those portions of the cable 6 lying between said bodies are covered with a thin syntheitc coating 9, which is also directly formed on the cable 6.

The joint 7 of the cable 6 is equal to, and takes the place of, one of the bodies 8.

As shown in FIGS. 1 and 2, each sectional casing 4, 5 comprises two opposing half-shells which contain a central hole and are formed by blanking/drawing a thin metal sheet, said half-shells being fixed together by clinching, this being done by bending a series of perimetral lugs 40, 50 rigid with one half-shell (FIG. 2) over the other half-shell (FIG. 1).

Concentrically with the central hole of each half-shell there is also provided a circular recess 41, 51 for receiving the respective sprocket wheel 2, 3, this latter being provided on one face with a circumferential groove 22.

This latter receives, practically as an exact fit, a circumferential lip 44 (FIG. 2) which bounds the central hole of the corresponding half-shell, and acts as the support and guide element for said sprocket wheel 2, 3.

In addition, from each recess 41, 51 there tangentially extend two diametrically opposing semi-cylindrical parallel ducts 42, 52.

As can be seen, the facing pairs of said ducts 42, 52 clamp the opposing end of two flexible tubes 10 constructed of a synthetic material and housing with slight transverse play (FIG. 3) that part of the flexible element 1 external to said two casings 4, 5 (see FIG. 1). Again with reference to FIG. 1, two blocks 11 are slidingly mounted on the tubes 10 to enable the tubes 10 to be fixed in the required configuration, whereas respective perimetral series of through holes 43, 53 are provided for fixing the casings 4, 5.

As stated in the introduction, the described transmission unit is suitable for the most widespread applications because of its small overall size and the fact that it can assume configurations conforming to its connection housing, without this compromising its functionality.

In this respect, the invention can be mounted in the illustrated flat configuration, with the tubes 10 bowed inwards or outwards with respect to the axis of the flat ring shown in FIG. 1, or the tubes 10 can be bent in many other directions, or twisted about themselves.

In the particular application shown in FIG. 1, the invention is used for sliding a suitably guided rack 12, for example associated with a sliding door or panel such as a side window of an automobile.

In order to slide said rack 12, the sprocket wheel 3 is provided with inner toothing 13 for fitting into the grooved portion 14 of a pinion assembly 15 which is provided at its opposite end with a pinion gear 16 for engaging said rack 12.

Said pinion assembly 15 is locked axially on to the driven sprocket wheel 3 by a split ring 17.

Finally, for rotating the drive sprocket wheel 2, which itself controls the sliding of the flexible element 1, there is provided a small reduction gear unit 18 of the helical gear-worm type, this latter being driven by a small electric motor 19.

The sprocket wheel 2 and reduction gear unit 18 are fixed together axially by a coaxial bolt 20, and said elements are kinematically linked by way of a suitable friction gear (not shown), the driven element of which torsionally engages a series of equidistant radial blades 21 provided on the sprocket wheel 2 (FIG. 1).

The use and advantages of the invention are apparent from the aforegoing description and from a simple examination of the accompanying figures.

I claim:

1. A transmission unit comprising, in combination, an endless flexible element in the form of a flexible metal wire on which a plurality of small equidistant coaxial cylindrical bodies are fixed, a first sprocket wheel in a first casing, means for rotatable mounting said first sprocket wheel in said first casing for rotation about an axis on said first casing, a second sprocket wheel in a second casing, means for rotatable mounting said second sprocket wheel in said second casing for rotation about an axis on said second casing, first and second flexible sheaths extending between said casings and having opposite ends thereof fixed respectively to said casings, said flexible element passing at least partly about each sprocket wheel and having respective lengths thereof extending through said flexible sheaths, for driving one of said sprocket wheels in response to rotation of the other of said sprocket wheels, said flexible sheaths comprising means for guiding said flexible element in different curved configurations thereof, so that said casings can be mounted at different orientations relative to each other.

2. A transmission unit as claimed in claim 1, characterised in that said metal wire consists of a stranded cable (6), and said small bodies (8) are constructed of a rigid synthetic material directly thermoformed on said stranded cable (6).

3. A unit as claimed in claim 2, characterised in that those portions of cable (6) lying between said cylindrical bodies are covered with a thin layer (9) of synthetic material.

4. A unit as claimed in claim 2, characterised in that the opposing ends of said small cylindrical bodies (8) are of spherical cap shape.

5. A unit as claimed in claim 1, characterised in that said two flexible sheaths consist of two tubes (10) of relatively rigid synthetic material.

6. A unit as claimed in claim 1, characterised in that said two sectional casing (4), (5) each comprise two opposing metal half-shells which contain a central hole and are fixed together by clinching perimetral lugs (40), (50), each half-shell being provided with a coaxial recess (41), (51) for receiving the respective sprocket wheel (2), (3), from said recess (41), (51) there tangentially extending a pair of diametrically opposing semi-cylindrical ducts (42), (52) for clamping said tubes (10), the central hole of at least one half-shell of each casing (4), (5) being provided with an inner coaxial lip (44) to be slidingly received in a circumferential groove (22) in the corresponding sprocket wheel (2), (3).

* * * * *

US004767386B1

REEXAMINATION CERTIFICATE (3905th)

United States Patent [19]
Spaggiari

[11] B1 4,767,386
[45] Certificate Issued Oct. 19, 1999

[54] FLEXIBLE-ELEMENT TRANSMISSION UNIT FOR DRIVING ROTARY MEMBERS IN GENERAL

[75] Inventor: Alessandro Spaggiari, Correggio, Italy

[73] Assignee: SPAL S.r.l., Correggio, Italy

Reexamination Request:
No. 90/005,173, Dec. 1, 1998

Reexamination Certificate for:
Patent No.: 4,767,386
Issued: Aug. 30, 1988
Appl. No.: 06/854,486
Filed: Apr. 22, 1986

[30] Foreign Application Priority Data

Apr. 23, 1985 [IT] Italy .................................. 34849/85 U

[51] Int. Cl.$^6$ ............................... F16H 7/00; F16H 7/18
[52] U.S. Cl. ........................................... 474/148; 474/144
[58] Field of Search ............................ 474/62, 146, 147, 474/148, 150, 152, 153, 154, 165, 197, 198, 144; 384/416, 417; 180/84

[56] References Cited

U.S. PATENT DOCUMENTS

| | | | |
|---|---|---|---|
| 756,464 | 4/1904 | Astrup | 474/144 |
| 3,204,480 | 9/1965 | Bradbury | 74/425 |
| 3,540,301 | 11/1970 | Bartz | 474/148 |
| 3,821,906 | 7/1974 | Berg | 474/62 |
| 4,856,644 | 8/1989 | Reist | 198/716 |

FOREIGN PATENT DOCUMENTS

| | | |
|---|---|---|
| 1108374 | 1/1956 | France . |
| 3309289 | 9/1984 | Germany . |
| 3428963 | 3/1985 | Germany . |
| 839148 | 5/1985 | Germany . |
| 15328 | of 1892 | United Kingdom . |
| 924 | of 1893 | United Kingdom . |

OTHER PUBLICATIONS

Bernard Wasko, "Bead Chains For Light Service", 1957, Voland and Sons, Inc.

W.M. Berg, "Plastics Transmission Belts With Geared Pulleys", PIC Design Corp. No Date.

UNUS International Brochure, Nos. 1–7 No Date.

Wolf Brochure, Universal Power Windows, External Power Windows No Date.

Translation of 3,309,289 by James R. McKenzie–Wardell, dated Jun. 3, 1997.

*Declaration of James R. McKenzie–Wardell dated Jun. 3, 1997 that U.S. Patent 4,856,644 shows and describes the same device which is shown and described in German published patent application 34 28 963 A1.

*Primary Examiner*—Thomas R. Hannon

[57] ABSTRACT

A transmission unit comprises a flexible element (1) in the form of a flexible metal wire (6) on which a plurality of small equidistant coaxial cylindrical bodies (8) are fixed; the element (1) passes endlessly about two opposing drive and driven sprocket wheels (2), (3) respectively, and the two outward and return portions of said element (1) are slidingly received in two flexible sheaths (10); the two sprocket wheels (2), (3) are rotatably mounted in respective casings (4), (5) in which the opposing ends of said two flexible sheaths (10) are clamped.

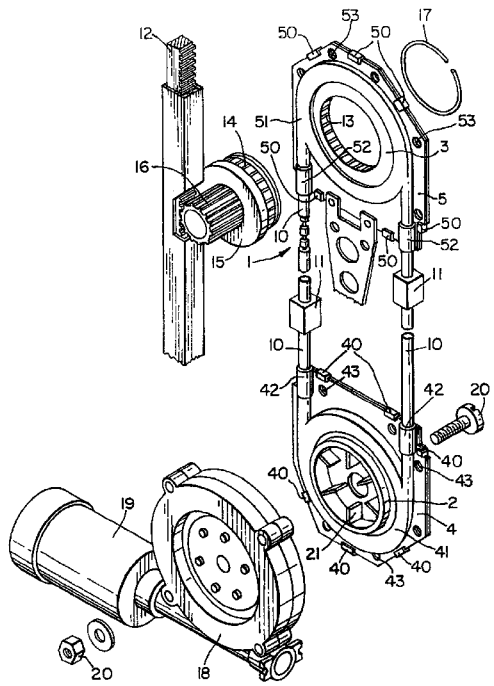

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *